Aug. 9, 1927.  L. K. SNELL  1,638,599
COWL VENTILATOR FOR MOTOR VEHICLES
Filed Oct. 27, 1919  2 Sheets-Sheet 2
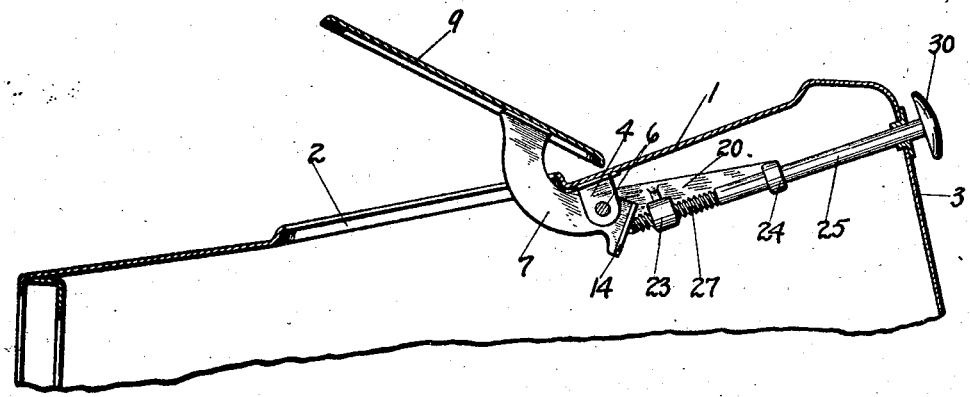
Fig. III.
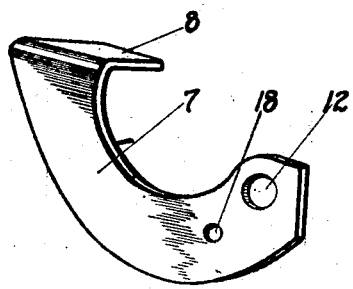
Fig. IV.
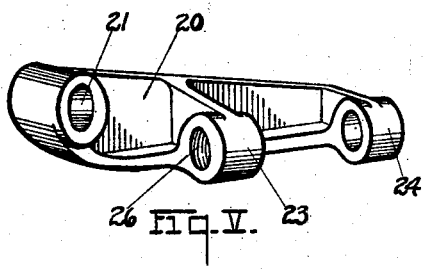
Fig. V.
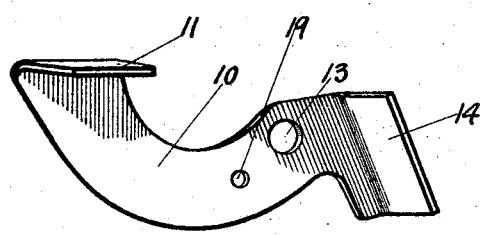
Fig. VI.
INVENTOR.
Lyle K. Snell.
BY Chester H. Braselton
ATTORNEY.

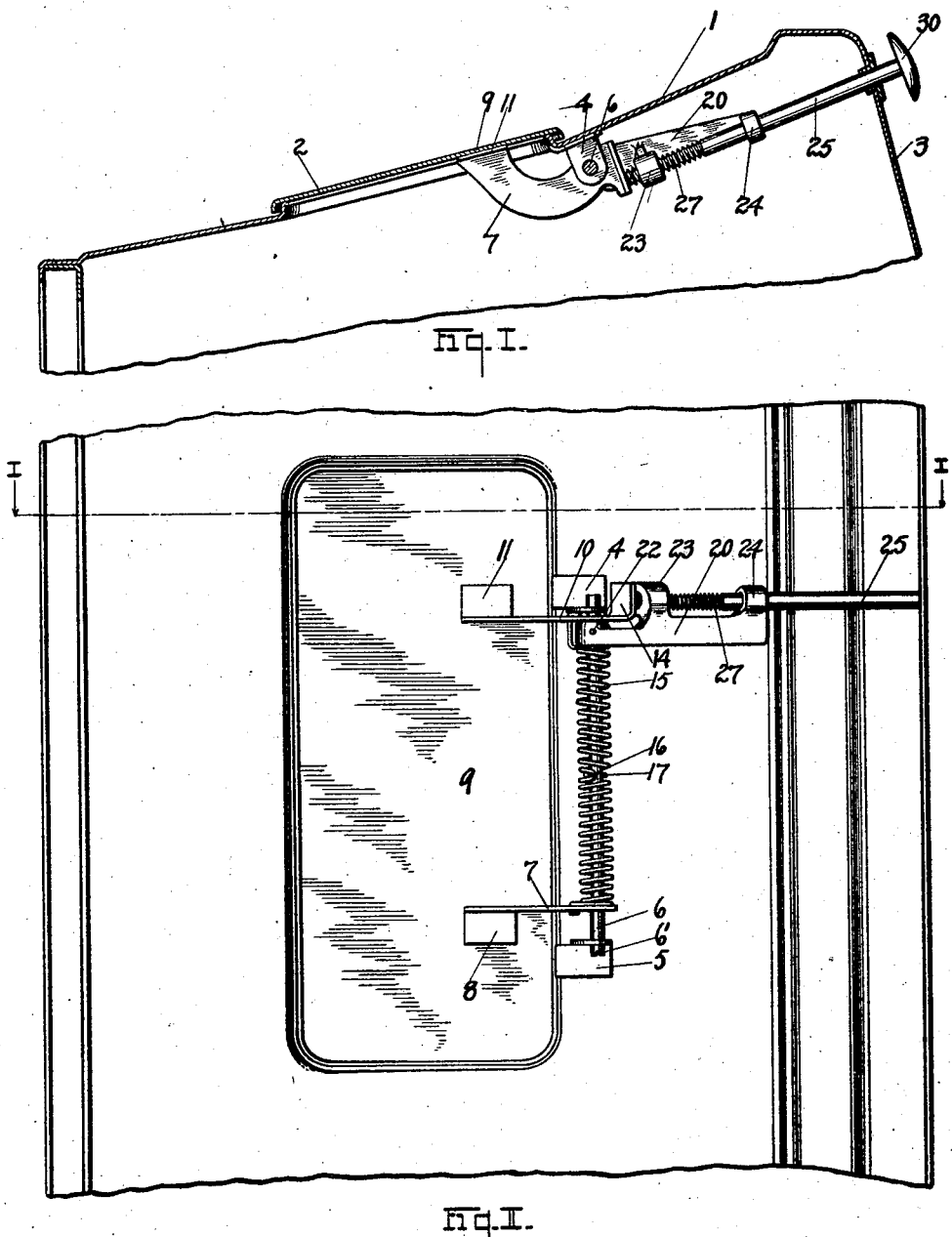

Patented Aug. 9, 1927.

1,638,599

UNITED STATES PATENT OFFICE.

LYLE K. SNELL, OF TOLEDO, OHIO, ASSIGNOR TO THE WILLYS-OVERLAND COMPANY, OF TOLEDO, OHIO, A CORPORATION OF OHIO.

COWL VENTILATOR FOR MOTOR VEHICLES.

Application filed October 27, 1919. Serial No. 333,803.

This invention relates to improvements in cowl ventilators for motor vehicles.

One object of the invention is to provide improved means for ventilating a motor vehicle, comprising a ventilating opening in the cowl thereof and a cover for said opening, together with improved means for operating the cowl from a point adjacent the driver's seat.

A further object of the invention is to provide simple and efficient means for operating the cowl ventilator, said means being readily actuated and of such a nature as to resiliently hold the cover for the ventilator opening either in open or closed position.

A further object of the invention is to provide a device of this character which is of simple construction and efficient in operation.

Further objects of the invention relate to economies of manufacture and details of construction as will hereinafter appear from the detailed description to follow.

The objects of the invention are accomplished in one instance by the devices and means described in the following specification, but it is evident that the same may be varied widely without departing from the scope of the invention as pointed out in the appended claims. A structure constituting one embodiment of the invention is illustrated in the accompanying drawings forming a part hereof in which:

Figure I is a vertical sectional view through the cowl portion of an automobile, illustrating the ventilator and the actuating mechanism therefor.

Figure II is a bottom plan view of the cowl portion of an automobile illustrating the position of the ventilator and the actuating mechanism therefor.

Figure III is a sectional view of the cowl portion of an automobile, illustrating the position of the ventilator cover when the same is raised.

Figure IV is a detail perspective view illustrating one of the brackets adapted to be secured to the cover for pivotally supporting the same from the supporting shaft.

Figure V is a perspective view of the bracket which is adapted to be fixedly secured to the supporting shaft and which serves to operatively support the cover actuating member.

Figure VI is a perspective view of the other cover supporting bracket, and illustrates the manner of forming the same to provide an offset portion adapted to co-operate with the cover actuating member in raising and lowering the cover.

In the embodiment of the invention illustrated herewith, 1 designates the cowl portion of an automobile which may be of the usual or any ordinary construction, and which is provided with a ventilating opening 2 formed upon the upper surface thereof, a portion of the material forming the cowl of the automobile being bent downwardly adjacent to driver's seat, thus providing the usual instrument board 3. A pair of brackets 4 and 5 are firmly secured to the lower surface of the upper portion of the cowl adjacent the opening 2, each of these brackets being provided with openings formed therein so arranged as to receive the end portions of a shaft 6. A curved bracket 7 is provided with an offset portion 8 which is firmly secured to the under surface of the cover member 9 adjacent one end portion thereof, while a somewhat similar bracket member 10 provided with a correspondingly offset portion 11 has the offset portion firmly secured to the under surface of the cover adjacent the opposite end thereof. The bracket members 7 and 10 are provided with aligned openings 12 and 13 respectively, through which the shaft 6 is passed whereby the cover member 9 is rotatably supported upon the shaft 6. The bracket member 10 is provided with a second offset portion 14 located adjacent the point where the bracket member is pivotally mounted upon the shaft 6, the offset portion 14 being adapted to co-operate with the rotatable actuating member for raising and lowering the cover in a manner which will be hereinafter described.

A coil spring 15 provided with a loop adjacent the central portion thereof, and having the opposite ends of the spring coiled in opposite directions from the loop 16 is mounted upon the shaft 6 in such a manner that the loop 16 engages with a pin 17 carried by the shaft for preventing rotation of the coil spring relative to the shaft in one direction. The opposite ends of the springs are adapted to be inserted in similar openings 18 and 19 formed in the brackets 7 and 10 respectively, whereby the tension exerted by the spring serves to draw the cover downwardly and tends to normally retain the same in engagement with the upper portion of the cowl for closing the opening therein.

The bracket member 20 is provided with an opening 21 adjacent one end thereof within which is adapted to be positioned the shaft 6, the bracket 20 being non-rotatably secured to the shaft 6 by means of a pin 22 passed through the end portion of the bracket and the shaft 6. The shaft 6 is provided with a transverse slot 6′ formed in one end thereof for the insertion of a proper tool whereby the shaft 6 may be rotated in order to properly tension the spring 15 before the pin 22 is passed through the bracket 20 and the shaft 6 for securing those parts together. In this way, the desired degree of tension may be imparted to the spring 15 in the first instance, and the tension of the spring may be regulated later as is found necessary. The bracket 20 is so positioned relative to the bracket 10 that the aligned bearings 23 and 24 carried by the bracket 20 are located adjacent the offset portion 14 of the bracket 10 and in line therewith. An actuating rod 25 is adapted to be mounted within the aligned bearings 23 and 24, and has one end portion thereof projecting through the instrument board 3 whereby the rod 25 is capable of being rotated from a point adjacent the driver's seat. The bearing 23 is provided with an internal thread 26 for co-operation with an external thread 27 formed upon one end portion of the operating rod whereby upon rotation of the rod the same is moved in an axial direction into engagement with the offset portion 14 of the bracket 10 for rotating the bracket 10 about the rod 6 as an axis and thus raising or lowering the cover 9. The end portion of the operating rod 25 which is located adjacent the driver's seat is provided with a handle 30 whereby the operating rod is capable of being readily rotated to raise or lower the cover.

It will be understood from the preceding description that when the operating rod 25 is rotated in one direction the end portion of the rod located adjacent the bracket 10 will bear against the offset portion 14 of the bracket and upon continued rotation of the rod the cover 9 will be raised against the tension exerted by the coil spring 15. When the operating rod is rotated in the opposite direction, the end portion of the rod which is adapted to bear against the offset portion 14 of the bracket will be drawn inwardly and the cover permitted to return to its normally closed position under the influence of the coil spring 15. It will be seen from the above description that a particularly simple and efficient form of cowl ventilator is provided wherein the various operating parts are of simple construction and capable of being readily and easily assembled. Moreover, the structure is capable of being readily and easily operated for raising and lowering the cover, and may be readily adjusted whereby the cover is constantly maintained in any of its desired positions.

While I have shown and described in considerable detail a specific embodiment of my invention, it is to be understood that this showing and description is illustrative only and for the purpose of rendering my invention more clear, and that I do not regard the invention as limited to the precise details of construction illustrated or described except in so far as I have included such limitations within the terms of the following claims, in which it is my intention to claim all novelty inherent in my invention broadly as well as specifically.

What I claim as new and desire to secure by Letters Patent is:

1. In a cowl ventilator for automobiles, a ventilator cover, a pivot therefor, a projection depending from said cover, an actuating rod threadably mounted at a fixed distance from said pivot and adapted to engage said projection to move said cover upon its pivot, and a spring operatively engaging said cover and urging said projection into contact with said rod.

2. In a cowl ventilator for automobiles, a ventilator cover, a pivot shaft therefor, a coil spring surrounding the shaft and tending to hold the cover in closed position, a projection depending from said cover, and rotatable means adapted to be moved bodily endwise by rotation to engage said projection for raising the cover against the tension of the coil spring.

3. In a cowl ventilator for automobiles, a ventilator cover, brackets adapted to be carried by the cowl, a shaft mounted in said brackets, means for pivotally mounting the cover at a plurality of points upon the shaft, and a screw for rotating the said cover upon the shaft and for holding it in a plurality of raised positions relative to the cowl.

4. In a cowl ventilator for automobiles, a shaft adapted to be supported beneath the cowl, a ventilator cover pivotally mounted upon said shaft, a coil spring surrounding the shaft and adapted to normally hold the cover in closed position, and a member adapted for rotation whereby to move endwise bodily into engagement with a depending portion of the cover, the said member being adapted to project through the instrument board of the automobile for rotating the cover upon the shaft and for holding it in any one of a plurality of raised positions.

5. In a cowl ventilator for automobiles, a shaft adapted to be supported beneath the cowl, a ventilator cover pivotally mounted upon said shaft, a bracket, and a rod supported by the bracket and adapted to be bodily moved into engagement with a depending portion of the cover and to operate the cover upon the shaft, and co-operating means upon the bracket and shaft for holding the cover in any one of a plurality of raised positions.

6. In a cowl ventilator for automobiles, a ventilator cover, a shaft, means for supporting the shaft near the ventilator opening, a bracket fixedly mounted with respect to the shaft, a cover provided with brackets pivotally supported by the shaft, one of said cover brackets being provided with an offset portion, and a member rotatably mounted in the first named bracket and adapted upon rotation to co-operate with said offset portion for raising and lowering the cover.

7. In a cowl ventilator for automobiles, a ventilator cover, a shaft, means for supporting the shaft against rotation, means for pivotally mounting the cover upon said shaft, a coil spring surrounding the shaft and connected with the cover, means for raising the cover against the tension exerted by the coil spring, and means for regulating the tension of the spring.

8. In a cowl ventilator for automobiles, a ventilator cover, a shaft, means for supporting the shaft against rotation, means for pivotally mounting the cover upon said shaft, a coil spring surrounding the shaft and connected at one point with the cover and at another point with the shaft, means enabling said shaft to be rotated to adjust the tension of the spring, and means for locking the shaft in any one of various positions of rotation.

9. In combination with a structure having a ventilating opening, a cover for said opening, a projection on said cover, a hinge pintle supported near said opening and upon which said cover is mounted to swing, a bracket having one end fixed to the pintle, a rod supported by the bracket and adapted to bear at one end against said projection, and a guide for the rod fixed with respect to said structure, said rod being movable within limits, both in the bracket and guide, whereby the cover may be swung about said hinge pintle.

10. In combination with a structure having a ventilating opening, a cover for said opening, a projection on said cover, a hinge pintle supported near said opening and upon which said cover is mounted to swing, a bracket having one end fixed to the pintle, a rod threaded into the bracket and adapted to bear at one end against said projection, and a guide for the rod fixed with respect to said structure, whereby upon the rotation of said rod the cover may be swung into any one of various positions and there maintained.

11. In an automobile cowl ventilator, the combination with an apertured wall having a cover therefor, a bracket carried by said wall, a lever secured to said cover and pivotally carried by said bracket, a rotatable adjusting screw having a bearing connected with said wall and engageable with a portion of said lever, and a supporting arm carried by said bracket and having two spaced points of bearing for said screw, said screw being threaded to one of said bearings, whereby to move said screw longitudinally of its axis.

12. In a closure, the combinatian with an apertured wall having a cover therefor, a bracket carried by said wall, a lever secured to said cover and pivotally carried by said bracket, a rotatable adjusting screw having a bearing connected with said wall and engageable with a portion of said lever, a supporting arm carried by said bracket and having two spaced points of bearing for said screw, said screw being threaded to one of said last mentioned bearings, whereby to move said screw longitudinally of its axis, and a spring connected with said cowl and bracket, whereby to normally maintain said cover at closed position.

13. In an automobile cowl ventilator, the combination with an apertured wall, a cover therefor, a bracket carried by said wall, a lever secured to said cover and pivotally carried by said bracket, a rotatable adjusting screw having a bearing connected with said wall and engageable with a portion of said lever, a supporting arm having a bearing for said screw and a part spaced from said bearing and in screw threaded engagement with said screw.

14. In an automobile cowl ventilator, the combination with an apertured wall, a cover therefor, a bracket carried by said wall, a lever secured to said cover and pivotally carried by said bracket, a rotatable adjusting screw having a bearing connected with said wall and engageable with a portion of said lever, a supporting arm having a bearing for said screw and a part spaced from said bearing and in screw threaded engagement with said screw, and a spring for moving the cover in one direction against the action of the screw.

15. In combination with a wall having a ventilating opening, and a cover movably supported in operative relation thereto, a spring tending to move the cover to closed position, and a screw shaft supported in such manner as to be reciprocated when turned and serving to adjust the cover in opposition to the aforesaid spring.

In testimony whereof, I affix my signature.

LYLE K. SNELL.